(12) United States Patent
Zapf

(10) Patent No.: US 8,717,130 B2
(45) Date of Patent: May 6, 2014

(54) LACQUER COMPOSITION AND USE THEREOF

(75) Inventor: Lothar Zapf, Alzenau (DE)

(73) Assignee: Vacuumschmeize GmbH & Co. KG, Hanau (DE)

( * ) Notice: Subject to any disclaimer, the term of this patent is extended or adjusted under 35 U.S.C. 154(b) by 345 days.

(21) Appl. No.: 13/019,548

(22) Filed: Feb. 2, 2011

(65) Prior Publication Data

US 2012/0034458 A1 Feb. 9, 2012

(30) Foreign Application Priority Data

Feb. 9, 2010 (DE) .................. 10 2010 001 722

(51) Int. Cl.
*H01F 7/02* (2006.01)
*C09J 163/02* (2006.01)
*C09J 163/04* (2006.01)
*C09J 163/06* (2006.01)

(52) U.S. Cl.
USPC ........... 335/306; 156/330; 523/427; 525/523; 525/524

(58) Field of Classification Search
USPC ................. 156/330; 523/427; 525/523, 524; 335/306
See application file for complete search history.

(56) References Cited

U.S. PATENT DOCUMENTS

| | | | |
|---|---|---|---|
| 3,474,073 A | | 10/1969 | Higashi |
| 4,103,195 A | * | 7/1978 | Torossian et al. ...... 310/216.065 |
| 5,075,155 A | * | 12/1991 | Jellinek et al. ................ 428/209 |
| 5,098,496 A | * | 3/1992 | Breitigam et al. ............ 156/180 |
| 6,103,157 A | * | 8/2000 | Behm et al. .................... 264/102 |
| 6,555,601 B1 | * | 4/2003 | Behm et al. .................... 523/435 |

FOREIGN PATENT DOCUMENTS

| | | |
|---|---|---|
| DE | 10 2006 012 839 A1 | 9/2007 |
| DE | 10 2007 025 668 A1 | 12/2008 |
| EP | 0 889 484 A2 | 1/1999 |
| JP | 63227686 A | 9/1988 |
| JP | 2003147261 A | 5/2003 |
| JP | 2004515565 A | 5/2004 |
| JP | 2009530449 A | 8/2009 |
| WO | WO 2008/148402 A1 | 12/2008 |
| WO | WO 2009/063043 A1 | 5/2009 |

OTHER PUBLICATIONS

Technical Data Sheet for ALBIDUR EP 2240 A, provided by Evonik Industries AG (no date).*
Technical Data Sheet for Silquest A-187, provided by Momentive Performance Materials Inc. (no date).*
Office Action dated Sep. 28, 2010 for German Patent Application No. 10 2010 001 722.1-43 (German Language).
Search Report mailed May 16, 2011 for Great Britain Patent Application No. 1100578.2.
JP2011-022805, Notification of Reasons of Refusal, dated Jul. 19, 2013 (including English translation), 8 pages.

* cited by examiner

*Primary Examiner* — Michael J Feely
(74) *Attorney, Agent, or Firm* — Dickinson-Wright PLLC

(57) ABSTRACT

The present invention relates to a lacquer composition, particularly an adhesive and corrosion-protective lacquer for rare earth magnets, on the basis of an epoxy resin mixture, a setting accelerator, a silane-based epoxy functional adhesion promoter and a solvent or a solvent mixture, wherein the lacquer composition includes 5 to 20 wt. %, with respect to the amount of solid resin in the base of the epoxy resin mixture, of a highly viscous epoxy resin based on bisphenol-A with an elastomer content of more than 30 wt. %.

28 Claims, No Drawings

LACQUER COMPOSITION AND USE THEREOF

BACKGROUND

1. Field

Disclosed herein is a lacquer composition, particularly an adhesive and corrosion-protective lacquer for rare earth permanent magnets, based on an epoxy resin mixture, a setting accelerator, a silane-based epoxy functional adhesion promoter and a solvent or a solvent mixture and to a method of manufacturing magnet systems using the aforementioned lacquer composition.

2. Description of Related Art

Magnets and magnet systems, particularly those which include neodymium-iron-boron magnets, must generally be protected from corrosion. This necessitates an appropriate coating, e.g. a lacquer coating.

When assembling magnet systems, magnets are furthermore connected adhesively beneath one another or to other workpieces, such as steel flux guides or other soft magnetic workpieces. It is thus required of the adhesive connection that it has a high strength, preferably >10 N/mm$^2$ in conjunction with a high temperature resistance because, when used in motors, temperatures of up to 180° C. occur and high opposing fields act on the magnets. The adhesive connection must withstand these conditions.

In the case of so-called segmented magnet systems, which are composed of a plurality of individual magnets, the adhesive connection has the purpose of fixing the packet or holding it together and also being responsible for insulation of the individual magnets with respect to one another. Such systems are used, for instance, in large, electrically operating machines, such as ships motors, wind turbine generators, etc. The electrical insulation of the individual magnets prevents the occurrence of high eddy currents and thus overheating of the motor.

In the conventional manufacture of magnet systems, the magnets are commonly glued together with the aid of liquid high-performance adhesives (epoxy resins, acrylates etc.). The magnet systems are then provided with a corrosion-protective lacquer, generally a stoving varnish, which protects the system from environmental and chemical influences, depending on its usage. There is the problem in this case that lacquer voids occur, particularly in the vicinity of the adhesion gap as a result of trapped gas or air bubbles. Attempts were therefore made to apply the corrosion protection before or during the adhesion process.

DE 10 2006 012 839 B4 describes a lacquer composition based on an epoxy resin mixture, a setting accelerator, a silane-based epoxy functional adhesion promoter and a solvent, which has not only adhesive but also corrosion-protective properties so that when it is used the adhesion and the corrosion protection of the magnets can be effected in one method step. Magnets are coated in the method with the appropriate lacquer compositions and then fixed in position with the aid of spring or clamping devices in the arrangement of the subsequent magnet system. The magnet systems thus arranged are then brought together with the clamping tools up to the curing temperature in the furnace. The joint surfaces are brought into contact by the application of pressure with the aid of the spring tools, whereby the lacquer, which is preferably applied on both sides, flows together and simultaneously sets. The individual magnets are stuck together in this manner to form magnet systems. This method has the disadvantage that the individual components of the magnet system are only firmly stuck together at relatively high temperatures so that a complex tool technology with a corresponding application of pressure is necessary for firing the corrosion-protective lacquer in order to produce a magnet system with a sufficient strength.

SUMMARY

Therefore a need in the art remained for a lacquer composition with which the disadvantages of the prior art outlined above do not occur when it is used.

This need is supplied by embodiments of a lacquer composition with the features disclosed herein.

There also remained a need in the art for a method for producing magnet systems, which does not have the disadvantages of the method in accordance with the prior art.

This need is supplied by embodiments of a method with the features disclosed herein.

It has been found that a lacquer composition based on an epoxy resin mixture, a setting accelerator, a silane-based epoxy functional adhesion promoter and a solvent or a solvent mixture constituting an adhesive and corrosion-protective lacquer for rare earth permanent magnets has particularly favourable properties if the epoxy resin mixture includes 1 to 94 wt. % of at least one solid epoxy resin with an epoxide number of at most 2 Eq/kg, 1 to 50 wt. % of at least one multifunctional solid epoxy resin with an epoxide number of >4 Eq/kg and 5 to 40 wt. % of a phenol and/or cresol novolac with a melting point >30° C., preferably >100° C. and the lacquer composition additionally includes 5 to 20 wt. %, with respect to the amount of solid resin in the base epoxy resin mixture, of a highly-viscous epoxy resin based on bisphenol-A with an elastomer content of >30 wt. %.

In the search for a solution of the problem set forth above, it was found that by the addition of highly viscous epoxy resins, modified with an elastomer content, on the basis of bisphenol-A the result was to reduce the adhesion temperature for the lacquer composition to room temperature so that the fixing in position of the individual adhesion partners no longer occurs during the curing process at increased temperature under the application of pressure but that the adhesion partners are fixed together in a hand-tight manner before the curing process by simply pressing them together, whereby a shear strength of >0.25 N/mm$^2$ is achieved. Another disclosed embodiment, therefore, relates to a magnet system comprising the lacquer composition described herein forming an insulation.

The viscosity of the highly viscous epoxy resin based on bisphenol-A at 23° C. is above 5,000 mPas, preferably above 50,000 mPas, whereby the resin is preferably a bisphenol-A diglycidyl ether and the elastomer content is preferably provided by a nitrile butadiene rubber.

In a preferred embodiment of the lacquer composition, the epoxy resin mixture includes 1 to 80 wt. % of a solid epoxy resin with an epoxide number <1 Eq/kg and 1 to 80 wt. % of a solid epoxy resin with an epoxide number of 1 to 2 Eq/kg. A further advantageous embodiment provides that the at least one solid epoxy resin with an epoxide number of at most 2 Eq/kg is an epoxy resin on the basis of bisphenol-A and/or bisphenol-F.

The multifunctional epoxy resin with an epoxide number >4 Eq/kg is advantageously selected from the group of epoxy phenol novolacs, epoxy cresol novolacs, triglycidyl isocyanurate and/or mixtures thereof. The setting accelerator preferably includes tertiary amines and/or imidazole derivatives, particularly preferably 2-ethyl-4-methylimidazole.

The epoxy functional adhesion promoter is preferably selected from the group consisting of γ-glycidylpropyltrimethoxysilane and β-(3,4-epoxycyclohexyl)-ethyltrimethoxysilane, wherein 0.1 to 5 wt. %, preferably 1 to 3 wt. %, of epoxy functional adhesion promoter, with respect to the total amount of solid resin, is preferably used.

5 to 40 wt. %, preferably 10 to 20 wt. %, phenol or cresol novolacs with a melting point >30° C., preferably >100° C., is preferably used as the hardener.

No particular requirements are placed on the solvent or solvent mixture, and aliphatic and aromatic hydrocarbons, ethers, esters, glycol ethers, alcohols, ketones and/or mixtures thereof can be used.

In order to improve the properties of the lacquer composition as a corrosion protector, it is advantageous if the lacquer composition additionally includes corrosion-protective pigments from the group comprising zinc phosphate, zinc chromate or zinc hydroxy phosphite.

A further advantage of the lacquer composition can be achieved by using additional additives, such as soluble colorants, flowing agents and defoamers, non-metallic fillers, such as quartz, such as quartz flour, mica and talcum, dispersible coloured pigments, such as carbon black or rutile, and dispersing aids and/or rheological additives and anti-deposition adjuvants, such as bentonites or aerosils (fumed silicas).

The corrosion resistance of the lacquer composition can be further improved by the addition of salt-like compounds from the group consisting of the vanadates, tungstenates, niobates or molybdates, particularly zinc molybdate.

The lacquering of the components is effected in the conventional manner by brushing, dipping, spraying, spinning, pouring or other methods, whereby the spraying method, both as a pass-through method and also as a bulk material method, is preferably used depending upon the geometry of the components to be lacquered. For this reason, it is also convenient if the solid component of the lacquer is not too high and is at most 50 wt. %, preferably between 10 to 20 wt. %.

The method described herein further provides that the individual adhesion partners are dried after the coating process, whereby it is to be realised that the lacquer compositions as described herein do not stick after application and initial drying so that the components may be handled without problem. After the application of the lacquer layer, which is preferably between 10 and 50 μm, the surface dried individual magnets are assembled and a relatively low pressure of 0.1 to 3 N/mm$^2$ is exerted on the assembly for a period of time of between 3 and 20 seconds. So-called cold flow of the lacquer occurs even at room temperature and the lacquer layers on the two joint partners flow into one another.

A further advantage of this method resides in the fact that as a result of the low pressure, the adhesion gap alters only minimally and the lacquer does not flow out of the gap. At the end of the application of the pressure, the individual components of the magnet system are connected together in a hand-tight manner, whereby the magnet system has a shear strength >0.25 N/mm$^2$ The magnet systems are then removed from the pressure device and cured in the firing furnace without pressure at temperatures between 150 and 250° C.

The properties of the end product with respect to temperature resistance, acid resistance, corrosion resistance, pressure resistance and resistance to cooling lubricants are not altered by the rubber content in the lacquer composition. Only the flow of the lacquer is positively influenced so that a very smooth and non-sticky surface is produced which is sufficiently hard and abrasion-resistant in order to manipulate the components with the aid of conveyor devices or a robot arm without the fear of damage to the lacquer layer. The possibility thus opens up of automating the lacquer adhesion process in an elegant manner, whereby firstly all the individual magnets are lacquered on all sides and the components are then, after drying the lacquer, formed with the aid of a robot arm in a positionally precise manner into stacks of magnets for the magnet system at temperatures between room temperature and 40° C. By the brief application of a pressure to the stack, the magnet system is stabilised to the extent that the stack can now be removed from the pressing device by grippers and transported by means of a conveyor belt to the pass-through curing furnace. After curing and cooling, the magnet systems are very stable and the individual magnets are connected together with a strength >10 N/mm$^2$. The lacquer can exhibit slight pressure points only at the engagement surfaces, whereby, however, the lacquer layer itself is not damaged so that the corrosion protection is not impaired. If it is wished to render the pressure points invisible for cosmetic reasons, the cured lacquer layers can be lacquered over with the composition without difficulty.

With the aid of the lacquer composition as described herein, finished magnet systems are produced which have a minimum compression strength of 10 N/mm$^2$, a long term temperature resistance of 150° C., a resistance to cooling lubricants of more than 1000 hours, a corrosion resistance of more than 1000 hours at 85° C. and 95% air humidity and a resistance in the salt spray test of more than 250 hours.

The cured lacquer layer has an electrically insulating effect.

The positive properties of the corrosion lacquer system are not impaired by the addition of highly viscous epoxy resins based on bisphenol-A with an NBR rubber content in the polymer chain of more than 30 wt. %, whereas the adhesion process is substantially simplified so that the manufacture of the magnet systems using the lacquers as described herein can be substantially automated. Furthermore, as a result of the nitrile butadiene rubber content, which is polymerised into the lacquer matrix, an increased resistance to temperature change by comparison with the conventional lacquers is produced, which is perceptible positively, particularly when connecting joint partners with strongly differing thermal coefficients of expansion, such as the combination of iron components with neodymium-iron-boron magnets.

DETAILED DESCRIPTION OF SPECIFIC EMBODIMENTS

Embodiments of the composition and method will be explained in detail below by way of examples.

Example 1

Production of a Preliminary Lacquer Solution 15 g of a bisphenol-A solid resin with an epoxide value of 0.03 Eq/kg, 6 g of a bisphenol-A resin with an epoxide number of 1.5 Eq/kg, 4.8 g of an epoxyphenol novolac with an epoxide value of 5.6 Eq/kg and 4.2 g of a cresol novolac with a melting point of 120° C. were dissolved in 200 g of a solvent mixture comprising three parts methyl ethyl ketone and one part ethanol. 2-ethyl-4-methylimidazole and 0.5 g γ-glycidyl-propyltrimethoxysilane were added to this solution.

Example 2

Production of a Spray Lacquer 45 g of fillers and 15 g of an epoxy resin modified with a nitrile butadiene rubber (Struktol-Polydis 3614, Schill &

Seilacher) and 4.5 g hardener were additionally added to 1000 g of a lacquer solution from Example 1, which has a solid resin content of 15%, whereby the same cresol novolac with a melting point of 120° C. as in the starting lacquer solution was used. Resin and hardener were initially dissolved in 100 ml of a methyl ethyl ketone/ethanol mixture in a ratio of 3:1 and then added to the base lacquer whilst stirring.

Example 3

Production of a Magnet System

The lacquer produced in Example 2 was sprayed by a spraying process onto a total of ten neodymium-iron-boron magnets with the dimensions 17.5×14.5×5 mm, which were thus coated on all sides with a lacquer layer approximately 25 μm thick. The coating was effected in a surface spraying process, whereby the magnets were firstly coated with lacquer from one side and the lacquer was then dried for two hours at 30° C. in a ventilating station with a fresh air supply. The components were turned and the process again repeated. The magnets thus lacquered were packed precisely to form a stack of ten with the aid of an angled device inclined slightly to the rear and a pressure of ca. 0.4 N/mm$^2$ was exerted on the stack of magnets by the brief application of a weight of 10 kg. A hand-tight connection of the individual magnets was produced in this manner and the stack of magnets was able to be removed without difficulty from the auxiliary device. The stack of magnets was now placed on a plate provided with a non-adhesive layer and the adhesive lacquer was fired at 180° C. for one hour in a circulating air furnace.

Example 4

Shear Tests

Shear tests in accordance with DIN 54451 were conducted on three different systems made in accordance with Example 3 with six, eight and ten segments, respectively, whereby pressure shear strengths of between 5 and 20 N/mm$^2$ were detected.

Example 5

Corrosion Test

A corrosion test was performed in an autoclave at 130° C., 2.7 bar pressure and 100% air humidity on three eight-segment magnet systems in accordance with Example 3, whereby absolutely no traces of corrosion were to be found on the systems even after a test time of ten days.

Example 6

Examination of the Insulation Characteristics

The electrical insulation effect of the coating was tested by applying a 32 V DC voltage to three ten-segment magnet systems, whereby the adhered block was in each case freed of lacquer on one side by sandpapering and acted on by a DC current source. All the adhesive connections exhibited an excellent insulating effect and permitted no current to flow in this test.

The tests outlined above show, for instance, the potential of the lacquer composition disclosed herein, without their constituting a limitation of the claimed invention, the advantages of which can be summarised as follows.

Due to the fact that, when using the lacquer composition in accordance with the invention, no complex adhesion tools with the application of pressure are necessary, the manufacturing costs for magnet systems can be generally reduced. The maintenance of the optimum pressure conditions is not critical in the method, since a substantially larger process window (between 0.1 to 3 N/mm$^2$) is available, in which comparable strength values are achieved, for the preliminary fixing of the individual magnet blocks. On the other hand, in the adhesion process using lacquer in accordance with the prior art, it was previously necessary for the suitable joint pressure to be separately determined for each application. A further advantage resides in the fact that during the curing process the adhesive lacquer can no longer be squeezed out of the adhesive gap, whereas in the curing process in accordance with the prior art, there is the risk with the subsequent application of pressure, that the external dimensions of the block of magnets change as a result of lacquer exiting from the adhesive gap, which necessitates subsequent processing or even places the ability of the magnet system to be used in doubt. As a result of the small shrinkage of the adhesive gap during curing, final dimensions of the finished system may now be monitored on the initially fixed system, which is associated with improved process control. As a result of the pressure-free curing of the lacquer layer, defects in the insulating layer as a result of foreign particles situated on the surface can be prevented since the lacquer only becomes liquid when pressure is no longer present so that the formation of a contact between the magnets as a result of foreign particles can be excluded. As a result of the non-adhesive properties of the lacquer layer after the drying process and the excellent strength of the magnet system, which is pre-fixed at room temperature, continuous automation is possible for mass production of magnet systems when using the lacquer composition in accordance with the embodiments disclosed herein.

The invention having been described herein with respect to certain of its specific embodiments and examples, it will be understood that these do not limit the scope of the appended claims.

The invention claimed is:

1. An adhesive and corrosion-protective lacquer composition for rare earth permanent magnets comprising a solid resin mixture, a setting accelerator, a silane-based epoxy functional adhesion promoter and a solvent or a solvent mixture, wherein the solid resin mixture includes, based upon the weight of the solid resin mixture:
   a) 1 to 94 wt. % of at least one solid epoxy resin with an epoxide number of at most 2 Eq/kg,
   b) 1 to 50 wt. % of at least one multifunctional solid epoxy resin with an epoxide number of >4 Eq/kg, and
   c) 5 to 40 wt. % of a setting agent with a melting point >30° C., which is selected from a phenol novolac, a cresol novolac, or a combination thereof,
wherein the lacquer composition further comprises 5 to 20 wt. % with respect to the amount of solid resin in the solid resin mixture, of a highly viscous epoxy resin based on bisphenol-A having an elastomer content of >30 wt. % and wherein the viscosity of the highly viscous epoxy resin based on bisphenol-A is >50,000 mPas at 23° C.

2. An adhesive and corrosion-protective lacquer composition for rare earth permanent magnets comprising a solid resin mixture, a setting accelerator, a silane-based epoxy functional adhesion promoter and a solvent or a solvent mixture, wherein the solid resin mixture includes, based upon the weight of the solid resin mixture:
   a) 1 to 94 wt. % of at least one solid epoxy resin with an epoxide number of at most 2 Eq/kg, b) 1 to 50 wt. % of at least one multifunctional solid epoxy resin with an epoxide number of >4 Eq/kg, and c) 5 to 40 wt. % of a setting agent with a melting point >30° C., which is selected from a phenol novolac, a cresol novolac, or a combination thereof, wherein the lacquer composition further comprises 5 to 20 wt. % with respect to the amount of solid resin in the solid resin mixture, of a highly viscous epoxy resin based on bisphenol-A having an elastomer content of >30 wt. %, wherein the elastomer content of the highly viscous epoxy resin based on bisphenol-A comprises nitrile butadiene rubber; and wherein the viscosity of the highly viscous epoxy resin based on bisphenol-A is >5,000 mPas at 23° C.

3. An adhesive and corrosion-protective lacquer composition for rare earth permanent magnets comprising a solid resin mixture, a setting accelerator, a silane-based epoxy functional adhesion promoter and a solvent or a solvent mixture, wherein the solid resin mixture includes, based upon the weight of the solid resin mixture:

a) 1 to 94 wt. % of at least one solid epoxy resin with an epoxide number of at most 2 Eq/kg, comprising:
1 to 80 wt. % of a solid epoxy resin with an epoxide number <1 Eq/kg, and 1 to 80 wt. % of a solid epoxy resin having an epoxide number of 1 to 2 Eq/kg;

b) 1 to 50 wt. % of at least one multifunctional solid epoxy resin with an epoxide number of >4 Eq/kg, and c) 5 to 40 wt. % of a setting agent with a melting point >30° C., which is selected from a phenol novolac, a cresol novolac, or a combination thereof, wherein the lacquer composition further comprises 5 to 20 wt. % with respect to the amount of solid resin in the solid resin mixture, of a highly viscous epoxy resin based on bisphenol-A having an elastomer content of >30 wt. % and wherein the viscosity of the highly viscous epoxy resin based on bisphenol-A is >5,000 mPas at 23° C.

4. A lacquer composition as claimed in claim 3, wherein in that the highly viscous epoxy resin based on bisphenol-A comprises a bisphenol-A diglycidyl ether.

5. The lacquer composition as claimed in claim 3, wherein the at least one solid epoxy resin with an epoxide number of at most 2 Eq/kg is an epoxy resin based on bisphenol-A, bisphenol-F or a combination thereof.

6. The lacquer composition as claimed in claim 3, wherein the multifunctional solid epoxy resin with an epoxide number >4 Eq/kg is selected from the group consisting of epoxy phenol novolacs, epoxy cresol novolacs, triglycidyl isocyanurate and mixtures thereof.

7. The lacquer composition as claimed in claim 3, wherein the setting agent with a melting point >30° C. is present in an amount of 10 to 20 wt. %.

8. The lacquer composition as claimed in claim 3, wherein the setting accelerator comprises tertiary amines, imidazole derivatives or a combination thereof.

9. The lacquer composition according to claim 8, wherein the imidazole derivative is 2-ethyl-4-methylimidazole.

10. The lacquer composition as claimed in claim 3, wherein the silane-based epoxy functional adhesion promoter is selected from the group consisting of γ-glycidyloxypropyltrimethoxysilane and β-(3,4-epoxycyclohexyl)-ethyltrimethoxysilane.

11. The lacquer composition as claimed claim 3, wherein the silane-based epoxy functional adhesion promoter is present in the amount of 0.1 to 5 wt. %, with respect to the total amount of solid resin.

12. The lacquer composition according to claim 11, wherein the silane-based epoxy functional adhesion promoter is present in an amount of 1-3 wt. % with respect to the total amount of solid resin.

13. The lacquer composition as claimed in claim 3, wherein the solvent or solvent mixture comprises aliphatic and aromatic hydrocarbons, ethers, esters, glycol ethers, alcohols, ketones, or mixtures thereof.

14. The lacquer composition as claimed in claim 3, wherein the lacquer composition has a solids content of 1 to 50 wt. %.

15. The lacquer composition according to claim 14, wherein the solids content is 10 to 20 wt. %.

16. The lacquer composition as claimed in claim 3, further comprising rust-protective pigments, or at least one salt-like compound selected from the group consisting of vanadates, tungstenates, niobates, molybdates and mixtures thereof.

17. The lacquer composition as claimed in claim 16, wherein the at least one salt-like compound comprises zinc molybdate.

18. The lacquer composition according to claim 16, wherein the rust-protective pigments comprise zinc phosphate, zinc chromate, or zinc hydroxyphosphite.

19. The lacquer composition as claimed in claim 3, further comprising one or more additional additives, selected from one or more soluble colorants, flowing agents and defoamers, non-metallic fillers, dispersible colouring pigments, dispersing adjuvants, rheological additives, or an anti-deposition adjuvants.

20. The lacquer composition according to claim 19, wherein the non-metallic fillers comprise quartz flour, mica, or talcum.

21. The lacquer composition according to claim 19, wherein the dispersible colouring pigment comprise carbon black or rutile.

22. The lacquer composition according to claim 19, wherein the anti-deposition adjuvant comprise bentonites or fumed silicas.

23. The lacquer composition according to claim 3, wherein the setting agent has a melting point >100° C.

24. A magnet system obtained by: forming a layer of the lacquer composition as claimed in claim 3 with a thickness of between 10 and 50 μm between two magnets or between a magnet and another workpiece; and curing the layer of lacquer composition, wherein the magnet system has a minimum compression strength of 10 N/mm$^2$, a long-term temperature resistance of 150° C., a resistance to cooling lubricants of >1000 hours, a corrosion strength of >1000 hours at 85° C. and 85% air humidity and a resistance in a salt spray test of >250 hours.

25. A method of manufacturing magnet systems using the lacquer composition as claimed in claim 3, comprising:
coating a first magnet with the lacquer composition to form a first coated magnet;
initially drying the lacquer layer;
joining together the first coated magnet with another coated magnet or another workpiece at a pressure of 0.1 to 3 N/mm$^2$ at a temperature of between 20 and 30° C. for a period of time of 3 to 30 seconds to form a magnet system with a shear strength of >0.25 N/mm$^2$; and
fixing the magnet system in position in an oven.

26. The method according to claim 25, wherein the joining together of the first coated magnet with another coated magnet or another workpiece is effected with the aid of a robot arm.

27. The method according to claim 25, further comprising curing the lacquer composition in the oven.

28. The method according to claim 27, wherein said curing results from heating the magnet system in said oven at a temperature between 150 and 250° C.

\* \* \* \* \*